Dec. 7, 1965 T. K. C. HARDESTY ETAL 3,222,485
ELECTRICAL PULL SWITCH UTILIZING SPRING BIASED PLUNGER
Filed Aug. 13, 1963 2 Sheets-Sheet 1

INVENTORS
Thomas K.C. Hardesty
BY Allen J. Sandheimer
ATTORNEY

Dec. 7, 1965   T. K. C. HARDESTY ETAL   3,222,485
ELECTRICAL PULL SWITCH UTILIZING SPRING BIASED PLUNGER
Filed Aug. 13, 1963   2 Sheets-Sheet 2

INVENTORS
Thomas K. C. Hardesty
Allen J. Sondheimer
BY
ATTORNEY

3,222,485
ELECTRICAL PULL SWITCH UTILIZING SPRING BIASED PLUNGER

Thomas K. C. Hardesty, Ednor, and Allen J. Sondheimer, Chevy Chase, Md., assignors to the United States of America as represented by the Secretary of the Navy
Filed Aug. 13, 1963, Ser. No. 301,925
8 Claims. (Cl. 200—161)
(Granted under Title 35, U.S. Code (1952), sec. 266)

The invention described herein may be manufactured and used by or for the Government of the United States of America for governmental purposes without the payment of any royalties thereon or therefor.

The present invention relates to electrical switches and more particularly to electrical pull switches which are actuated by a plunger shaft when sufficient force is applied thereto.

In the field of electrical switches, it has been the general practice to employ various types of switches to perform the function of actuating or deactivating a number of electrical circuits. Although such devices have served the purpose, they have not proved entirely satisfactory under all conditions of service for the reason that considerable difficulty has been experienced in maintaining a pressure tight seal around the switching mechanism. Prior devices have not been compact nor could they fit in a pressurized cover assembly. These devices also were not capable of repeated testing to check for reliability. Such devices also could not withstand the environmental requirements desired of electrical pull switches. Furthermore, these prior electrical switching devices had excessive chatter and contact resistance.

The general purpose of this invention is to provide an electrical pull switch which embraces all the advantages of similarly employed electrical pull switches and possesses none of the aforedescribed disadvantages. To attain this, the present invention contemplates a unique electrical pull switch arrangement whereby a number of electrical switches are actuated or deactivated when sufficient force is applied to a plunger shaft. The present invention maintains a pressure tight seal around the electrical pull switch assembly and is compact enough to fit in a pressurized cover assembly. The device is capable of repeated testing to check for reliability and is capable of withstanding the environmental requirements desired. The instant invention also provides electrical switching with a minimum of chatter and contact resistance.

An object of the present invention is the provision of a number of electrical pull switches which are actuated or deactivated when sufficient force is applied to a plunger shaft.

Another object is to provide a compact, pressure tight electrical pull switch having minimum chatter and contact resistance.

With these and other objects in view as will hereinafter more fully appear, and which will be more particularly pointed out in the appended claims, reference is now made to the following description taken in connection with the accompanying drawings in which:

Figure 1:
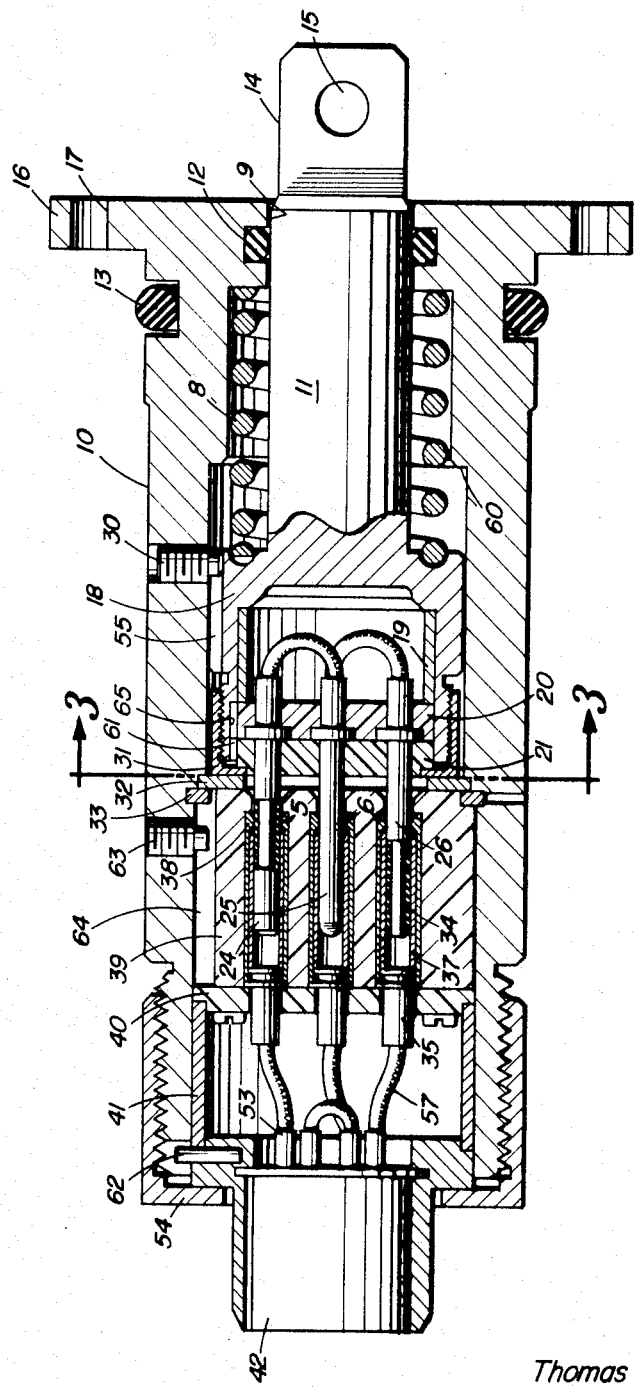
FIG. 1 is a cross-sectional view of the electrical pull switch.
Figure 3:
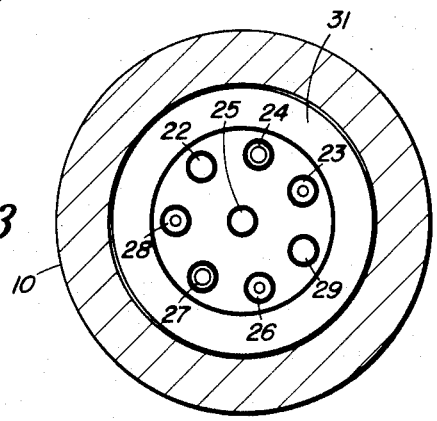
FIG. 3 is a cross-sectional view of the pull switch shown in FIG. 1 taken along section line 3—3 showing the male contact members separated from the female contact members.

Referring now to the drawings, wherein like reference characters designate like or corresponding parts throughout the several views, there is shown in FIG. 1, which illustrates a preferred embodiment, a housing 10 having an aperture 9 at one end thereof. The other end of the housing 10 is open and a plunger 18 having a plunger shaft 11 is insertable through the open end. The plunger shaft 11 is insertable through the aperture 9, and the plunger 18, which has male contact members 22–29 secured thereto, is guided along the housing wall by means of a guide screw 30 which rides in a groove 55 in the plunger 18. The plunger 11 is biased against the housing 10 by means of a coil spring 8. O-ring seal 12 provides a pressure tight seal between the plunger shaft 11 and the housing 10. A plastic circular spacer 19 serves to maintain the male contact members 22–29 a desired distance from the plunger 18. Eight male contact members 22, 23, 24, 25, 26, 27, 28 and 29 are held in position by circular plastic inserts 20, 21, the inserts being placed on either side of the male contacts 22–29 as shown in FIG. 1. The inserts 20, 21 have an extended portion 61 which slides in a groove 65 in the plunger 18 to prevent rotation of the male contact members. Male contact members 22, 29 and 25 as shown in FIG. 3 do not have any insulation on them. The other male contact members 23, 24, 26, 27 and 28 have insulation 34 surrounding each male member, the insulation being placed at the tip of the male contact member or at the center portion thereof as desired. A cap 31 is threadably connected to the plunger 18 to hold the male contact members securely within the plunger 18. Metal washer 32 maintains the plunger 18 against the bias of the coil spring 8. Snap ring 33 secures the metal washer 32 within the housing 10. A plastic socket contact housing 39 houses female socket contacts 38 which make an electrical circuit with the metallic portion of certain male contacts in the initial position as shown in FIG. 1 at 6. The housing 39 has a groove 64 therein for guide screw 63 which prevents rotation of the housing. If the insulation on the male contact members is adjacent to the female socket contacts as shown in FIG. 1 at 5, there is no electrical circuit between the female socket contacts 38 and the male contact members. Insulating sleeves 37 are mounted between the female socket contacts 38 and the male contact members. Plugs 35 are located adjacent to the insulating sleeves 37 and are soldered to the female contact members 38 to form a part thereof. A metal spacer 41 maintains the plastic socket contact housings 39 and 40 adjacent to each other. An electrical connector 42 having pin holes 43 on one side thereof and extension members 53 on the other side thereof is insertable in the housing 10 adjacent to the metal spacer 41 and is connected by pin 62 to housing 10 to prevent rotation of the connector. The retaining cap 54 is threadably connected to the housing 10 to secure the electrical connector 42 to the housing. Wires 57 connect electrical connector extension members 53 to the plugs 35.

Figure 2:
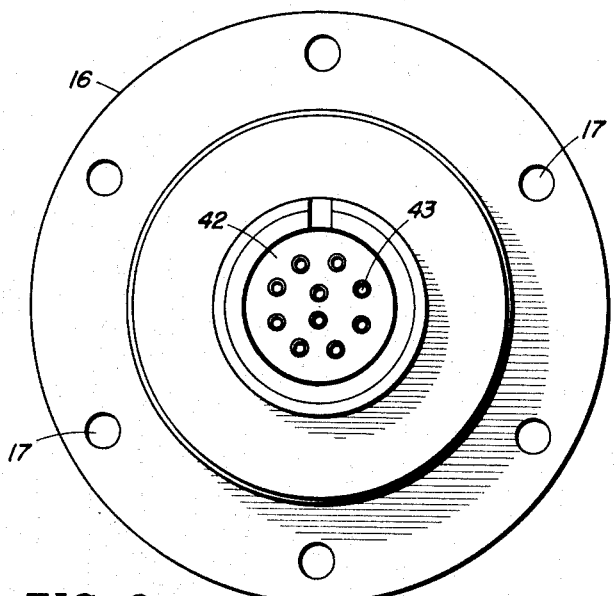
FIG. 2 is an end view of the electrical pull switch shown in FIG. 1 looking toward the electrical connector.

FIG. 2 shows an end view of the electrical pull switch looking toward the electrical connector 42. The connector has pin holes 43 therein containing inserts (not shown) which insure a complete electrical circuit between the connection made to the pin holes and the electrical connector extensions 53. Flange 16 of housing 10 has holes 17 therein for the attachment of the electrical pull switch assembly to a desired device. O-ring seal 13 provides a pressure tight seal between the pull switch and the device to which it is attached. The plunger shaft 11 has a fork member 14 having apertures 15 therein to which a lanyard can be attached in order that a pull force can be exerted on the plunger shaft 11.

Figure 4:
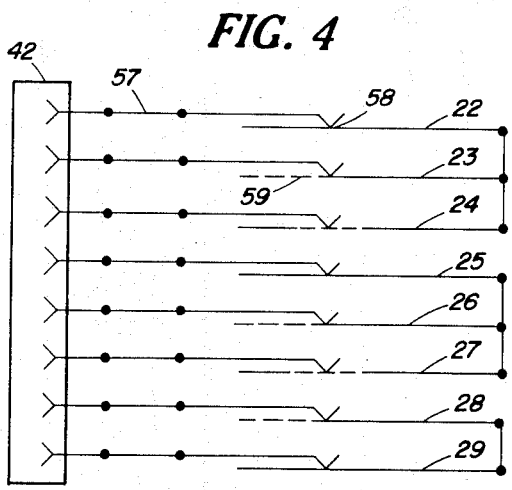
FIG. 4 is the electrical circuit diagram of the electrical pull switch shown in FIG. 1.

FIG. 4 shows the wiring diagram of the electrical pull switch in which the solid lines 58 represent an all metal male electrical contact. The dotted lines 59 represent insulation surrounding the male contact members.

The device operates in the following manner. A force is applied to the plunger shaft 11 by means of a lanyard lever or other actuating means attached to the apertures 15, the force being sufficient to overcome the force of coil spring 8 acting in opposition to the force exerted on the plunger shaft. As the force exerted by the lanyard causes the plunger 18 to move against the limit stop surface 60 shown in FIG. 1, the normally closed contacts open, and then a short time later the normally open contacts close. The rate, duration, and magnitude of the force thus affects the switch timing. It can be seen from FIG. 1 that a complete electrical circuit is maintained between the electrical connector 42, extension members 53, wires 57, plugs 35, socket contacts 38 and the male contact members which do not have insulation 34 in contact with the socket contacts 38. In the wiring diagram of FIG. 4, the male contact members 22, 25 and 29 are in direct electrical contact with the female socket contacts 38 at all times. The male contact members 23, 26 and 28 are in a normally closed position prior to actuation of the plunger 18. The male contact members 24 and 27 are in a normally open position prior to actuation of the plunger 18. After actuation of the plunger 18, the normally closed contacts are open and the normally open contacts are closed.

It is apparent that any desired number of male electrical contacts or female electrical contacts can be chosen to meet the desired function of the device. Also, the arrangement of the electrical contacts depends upon the requirements of the particular assembly. Furthermore, whether a particular contact is open or closed before or after the pull force is applied to the plunger 18 is obviously a matter of choice.

Thus it can be seen that an electrical pull switch has been devised in which a number of electrical switches are actuated or deactivated when sufficient force is applied to a plunger shaft. An electrical pull switch has been devised in which a pressure tight seal around the housing is maintained constantly. Furthermore, an electrical pull switch has been devised which is compact and which is adapted to fit into a pressurized cover assembly. The electrical pull switch also provides a minimum of chatter and contact resistance.

Various modifications are contemplated and may obviously be resorted to by those skilled in the art without departing from the spirit and scope of the invention, as hereinafter defined by the appended claims, as only a preferred embodiment thereof has been disclosed.

What is claimed is:
1. In an electrical pull switch, a switch housing having a plunger means slidable therein,
   spring means located adjacent to said plunger means and within the housing to resiliently bias the plunger means in a biased position,
   a plurality of male contact members securely housed within one end of the plunger means for movement in unison with said plunger, said male contact members being cylindrical and a selected number of said male contacts having insulation surrounding a portion of the length thereof,
   a socket contact housing located within said switch housing adjacent to one end of the plunger means,
   a plurality of female socket contact members insertable within said socket contact housing and mounted in such a manner to receive the male contact members and to slideably engage said male contact members over a constant surface area of electrical contact such that when the plunger means is in its biased position, certain of said male and female contact members are in electrically engaging contact with each other,
   whereby when said plunger means is moved against the bias of said spring means a selected number of the male and female contact members in electrically engaging contact are electrically disconnected while other of said contact members are positioned into electrically engaging contact.

2. An electrical pull switch as set forth in claim 1 wherein the female contact members comprise a hollow cylindrical socket.

3. An electrical pull switch as set forth in claim 1 wherein electrical conducting means are operatively connected to said female contact members.

4. An electrical pull switch as set forth in claim 1 wherein the plunger means comprises a plunger and plunger shaft slidable within the switch housing, said plunger shaft having a portion thereof extending through an aperture formed in one wall of said switch housing.

5. An electrical pull switch as set forth in claim 4 wherein said switch housing has apertured flange means thereon adapted to be attached to a member.

6. An electrical pull switch as set forth in claim 5 including an O-ring seal located between the plunger shaft and switch housing and a second O-ring mounted on the outer peripheral surface of said switch housing adjacent to said flange to provide a pressure tight seal when said switch is inserted into and secured to said member.

7. An electrical pull switch as set forth in claim 1 including guide means located within said switch housing to place the plunger means and male contact members in a desired position such that the male contact members will align with the corresponding female contact members which are also maintained in a desired position by a second guide means located within the switch housing.

8. An electrical pull switch as set forth in claim 1 including limit stop means in said switch housing to limit the movement of said plunger means when an external force is applied to the plunger means thereby causing certain of said male and female contact members to enter into electrical engaging contact and others of said members to be disengaged from electrical conducting engagement.

References Cited by the Examiner
UNITED STATES PATENTS

| | | | |
|---|---|---|---|
| 1,132,154 | 3/1915 | Bliley | 200—161 |
| 1,675,203 | 6/1928 | White | 200—16 X |
| 1,752,213 | 3/1930 | Treanor | 200—16 |

KATHLEEN H. CLAFFY, *Primary Examiner.*
ROBERT K. SCHAEFER, BERNARD A. GILHEANY,
*Examiners.*